(12) United States Patent
Elferich

(10) Patent No.: US 9,160,241 B2
(45) Date of Patent: Oct. 13, 2015

(54) DRIVER CIRCUIT FOR DRIVING A LOAD CIRCUIT

(75) Inventor: Reinhold Elferich, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 327 days.

(21) Appl. No.: 13/576,013

(22) PCT Filed: Feb. 1, 2011

(86) PCT No.: PCT/IB2011/050436
§ 371 (c)(1),
(2), (4) Date: Nov. 5, 2012

(87) PCT Pub. No.: WO2011/101761
PCT Pub. Date: Aug. 25, 2011

(65) Prior Publication Data
US 2013/0100706 A1    Apr. 25, 2013

(30) Foreign Application Priority Data
Feb. 8, 2010  (EP) .................................... 10152881

(51) Int. Cl.
*H02M 3/335*  (2006.01)
*H05B 33/08*  (2006.01)

(52) U.S. Cl.
CPC ....... *H02M 3/33523* (2013.01); *H05B 33/0815* (2013.01); *H02M 3/33561* (2013.01)

(58) Field of Classification Search
CPC .................... H02M 3/33523; H02M 3/33561; H05B 33/0815
USPC ...................... 363/15, 16, 75, 79, 81; 324/119
See application file for complete search history.

(56) References Cited

U.S. PATENT DOCUMENTS 5,068,776 A * 11/1991 Polivka ........................... 363/17
6,721,191 B2   4/2004 Duerbaum et al.
(Continued)

FOREIGN PATENT DOCUMENTS

DE    102005047548 A1    2/2007
JP      2010252610 A  *  11/2010
(Continued)

OTHER PUBLICATIONS

Machine translation of DE 10 2005 047548 A1. Original document published Feb. 15, 2007. Obtained from http://worldwide.espacenet.com/ on Oct. 15, 2014.*

*Primary Examiner* — Fred E Finch, III
(74) *Attorney, Agent, or Firm* — Yuliya Mathis

(57) ABSTRACT

Driver circuits (1) for driving load circuits comprise transformer circuits (21) with primary side windings to be coupled to source circuits and with secondary side windings to be coupled to the load circuits. By providing the driver circuits (1) with determination circuits (22) for determining secondary side currents as functions of primary side currents, primary side voltages, primary side inductances and transformer ratios, the secondary side currents can be determined solely at primary sides of the transformer circuits (21). Functions may define secondary side currents to be proportional to differences between first signals proportional to integrals of primary side voltages divided by primary side inductances and second signals proportional to primary side currents, the differences being multiplied by the transformer ratios. The primary side inductances may be inductances measured at primary sides and the transformer ratios may be voltage ratios of the transformer circuits (21), both for open secondary sides of the transformer circuits (21).

9 Claims, 10 Drawing Sheets

(56) References Cited

U.S. PATENT DOCUMENTS

| | | |
|---|---|---|
| 6,822,881 B2 | 11/2004 | Elferich |
| 6,829,151 B2 | 12/2004 | Elferich et al. |
| 6,898,091 B2 | 5/2005 | Van Bodegraven et al. |
| 7,352,269 B2 | 4/2008 | Li et al. |
| 7,385,831 B2 | 6/2008 | Ito et al. |
| 8,199,534 B2 * | 6/2012 | Halberstadt ............... 363/21.02 |
| 2007/0080652 A1 * | 4/2007 | Elferich et al. ............ 315/291 |
| 2008/0007977 A1 | 1/2008 | Piper et al. |
| 2008/0080105 A1 * | 4/2008 | Blaha et al. ..................... 361/38 |
| 2008/0192514 A1 * | 8/2008 | Zhou et al. ............... 363/21.12 |
| 2010/0244726 A1 * | 9/2010 | Melanson ..................... 315/291 |
| 2012/0081029 A1 * | 4/2012 | Choi et al. ..................... 315/291 |

FOREIGN PATENT DOCUMENTS

| | | | |
|---|---|---|---|
| WO | 2005048658 A1 | 5/2005 | |
| WO | 2005048685 A1 | 6/2005 | |
| WO | 2006103609 A2 | 10/2006 | |
| WO | 2007148271 A2 | 12/2007 | |
| WO | 2008104919 A1 | 9/2008 | |
| WO | 2008149275 A1 | 12/2008 | |
| WO | WO 2010020909 A1 * | 2/2010 | ............ H02M 3/338 |

* cited by examiner

DRIVER CIRCUIT FOR DRIVING A LOAD CIRCUIT

FIELD OF THE INVENTION

The invention relates to a driver circuit for driving a load circuit, and relates to a device, a method, a computer program product and a medium.

Examples of such a driver circuit are transformer circuits coupled to inverters or to be coupled to inverters. Further examples of such a driver circuit are power supplies comprising transformer circuits. Examples of such a load circuit are light emitting diode circuits. Examples of such a device are lamps.

BACKGROUND OF THE INVENTION

US 2008/0007977 A1 discloses a switch mode power supply system, which system can sense a secondary side current at a primary side of a transformer circuit. To achieve this, the system comprises relatively complex timing and modeling circuitry.

SUMMARY OF THE INVENTION

It is an object of the invention to provide a driver circuit for driving a load circuit, which driver circuit can determine a secondary side current at a primary side of a transformer circuit without requiring relatively complex timing and modeling circuitry. Further objects of the invention are to provide a device, a method, a computer program product and a medium.

According to a first aspect of the invention, a driver circuit is provided for driving a load circuit, the driver circuit comprising a transformer circuit with a primary side winding to be coupled to a source circuit and with a secondary side winding to be coupled to the load circuit, and a determination circuit for determining a secondary side current as a function of a primary side current and a primary side voltage and a primary side inductance and a transformer ratio.

A transformer circuit for example comprises a transformer with at its primary side a primary side winding and at its secondary side a secondary side winding. The primary side winding is to be coupled to a source circuit. According to a first option, the source circuit may comprise a supply, in which case the driver circuit may further comprise an inverter (or another switching circuit) for coupling the supply to the primary side winding. According to a second option, the source circuit may comprise a supply and an inverter (or another switching circuit) coupled to each other, in which case the inverter (or another switching circuit) is to be coupled to the primary side winding.

As a result of providing the driver circuit with a determination circuit for determining a secondary side current as a function of a primary side current and a primary side voltage and a primary side inductance and a transformer ratio, the secondary side current can be determined solely at the primary side of the transformer circuit, without relatively complex timing and modeling circuitry being required.

WO 2008/104919 A1 discloses a load current detection in an electrical power converter. To achieve this, an auxiliary winding has to be added to a transformer circuit. Such an auxiliary winding is however disadvantageous and should be avoided.

According to an embodiment, the driver circuit is defined by the load circuit comprising a load, the load comprising one or more light emitting diodes, said function defining the secondary side current to be proportional to a difference between a first signal proportional to an integral of the primary side voltage divided by the primary side inductance and a second signal proportional to the primary side current, the difference being multiplied by the transformer ratio. Especially, but not exclusively, for the load circuit comprising light emitting diodes, it is important to be able to determine the secondary side current at the primary side of the transformer circuit, for example to estimate a brightness and/or a color etc. According to the function, the secondary side current depends on the primary side voltage, the primary side inductance, the primary side current, and the transformer ratio.

According to an embodiment, the driver circuit is defined by the primary side inductance being an inductance measured at a primary side of the transformer circuit for an open secondary side of the transformer circuit, the transformer ratio being a voltage ratio of the transformer circuit for an open secondary side of the transformer circuit, and the difference being rectified before or after being multiplied by the transformer ratio and the difference being low-pass filtered after being multiplied by the transformer ratio. According to an equivalent circuit of the transformer circuit, an ideal transformer circuit is to be extended mainly with a primary side inductor coupled in parallel with an ideal primary side winding and with a secondary side inductor coupled in series with an ideal secondary side winding. The primary side inductor corresponds with the primary side inductance for an open secondary side of the transformer circuit. The voltage ratio is equal to a secondary side voltage divided by a primary side voltage for an open secondary side of the transformer circuit.

According to an embodiment, the driver circuit is defined by the determination circuit comprising a conversion circuit for establishing the first signal by multiplying the primary side voltage by a resistance and dividing the primary side voltage by the primary side inductance and taking the integral, and for establishing the second signal by multiplying the primary side current by the resistance and for taking the difference, the determination circuit further comprising an adaptation circuit for rectifying the difference and for multiplying the difference by the transformer ratio and for low-pass filtering the difference. The conversion circuit may, for this purpose, comprise one or more multipliers, dividers, integrators and subtracters etc. The adaptation circuit may, for this purpose, comprise one or more rectifiers, multipliers and filters etc.

According to an embodiment, the driver circuit is defined by the conversion circuit comprising first and second input terminals to be coupled to the source circuit, a serial circuit of a further resistance and a capacitance coupled to the input terminals, and first and second output terminals, the first output terminal being coupled to the first input terminal, the second output terminal being coupled to the second input terminal via the resistance, the primary side current flowing through the first output terminal and the primary side voltage being present across the output terminals, and a value of the capacitance being proportional to the primary side inductance divided by the resistance and by the further resistance. A voltage signal present across the capacitance may represent an output signal from the conversion circuit and an input signal for the adaptation circuit.

According to an embodiment, the driver circuit is defined by the load circuit comprising a load to be coupled to the secondary side winding and a further load to be coupled to a further secondary side winding of the transformer circuit, the load comprising one or more light emitting diodes, the further load comprising one or more further light emitting diodes, the determination circuit being designed for determining a further secondary side current as a further function of the primary side current and the primary side voltage and the primary side inductance and a further transformer ratio. In other words, in the case that the load circuit comprises two (or more) loads and the transformer circuit comprises two (or more) secondary side windings, according to a first/second (third etc.) function, the first/second (third etc.) secondary side current depends on the primary side voltage, the primary side inductance, the primary side current, and the first/second (third etc.) transformer ratio.

In the case that the load circuit comprises two loads and the transformer circuit comprises two secondary side windings, according to a first option the first (second) secondary side winding may be coupled to the first (second) load such that the first (second) secondary side current will flow through the first (second) load. According to a second option the first secondary side winding may be coupled to the first load and the first and second secondary side windings may be coupled to the second load such that the first secondary side current will flow through the first load and such that a sum of the first and second secondary side currents will flow through the second load. For the load circuit comprising three or more loads, similar options will be possible.

According to an embodiment, the driver circuit is defined by said function defining the secondary side current to be proportional to a difference between a first signal proportional to an integral of the primary side voltage divided by the primary side inductance and a second signal proportional to the primary side current, the difference being multiplied by the transformer ratio, and said further function defining the further secondary side current to be proportional to the difference between the first signal and the second signal, the difference being multiplied by the further transformer ratio.

According to an embodiment, the driver circuit is defined by the determination circuit comprising a conversion circuit for establishing the first signal by multiplying the primary side voltage by a resistance and dividing the primary side voltage by the primary side inductance and taking the integral, and for establishing the second signal by multiplying the primary side current by the resistance and for taking the difference, the determination circuit further comprising an adaptation circuit for rectifying the difference and for multiplying the difference by the transformer ratio and for low-pass filtering the difference, and the determination circuit further comprising a further adaptation circuit for rectifying the difference and for multiplying the difference by the further transformer ratio and for low-pass filtering the difference.

According to an embodiment, the driver circuit is defined by the determination circuit further comprising an offset detection circuit coupled between the conversion circuit on the one hand and the adaptation circuits on the other hand for in response to a trigger signal detecting an offset in the difference. The offset detection circuit may comprise a sample and hold circuit (possibly extended with an integration circuit) that receives the output signal from the conversion circuit (the input signal for the adaptation circuits) and that receives the trigger signal.

According to an embodiment, the driver circuit is defined by the determination circuit further comprising a generation circuit coupled to the offset detection circuit for generating the trigger signal. According to a first option, the generation circuit may comprise a selector circuit that receives a control signal from an inverter (or another switching circuit), wherein in dependence on a duty cycle of the inverter (or another switching circuit) either a rising edge or a falling edge will result in the trigger signal. According to a second option, the generation circuit may comprise a comparator circuit, wherein the output signal from the conversion circuit, possibly after being high-pass filtered, is compared with a threshold and a comparison result will result in the trigger signal.

According to an embodiment, the driver circuit is defined by the fact that it further comprises an inductor circuit with an inductor between the secondary side winding and the load, and with a further inductor between the further secondary side winding and the further load, the inductor and the further inductor being inductively coupled for balancing the secondary side current and the further secondary side current. Especially, but not exclusively, for different loads comprising light emitting diodes, it is important to balance the secondary side currents flowing through the loads, to compensate for component fluctuations and/or to compensate for brightness variations and/or color variations. Especially, but not exclusively, for driver circuits comprising inductors for balancing secondary side currents, it is important to avoid auxiliary windings and relatively complex timing and modeling circuitry, to keep sizes relatively small and costs relatively low. Each inductor may be a single inductor or may be a part of a single inductor or may be a transformer circuit or may be a part of a transformer circuit.

WO 2008/149275 A1 may provide more information about balancing secondary side currents.

According to a second aspect of the invention, a device is provided comprising the driver circuit as defined above, and further comprising the load circuit.

According to a third aspect of the invention, a method is defined for driving a load circuit via a transformer circuit with a primary side winding to be coupled to a source circuit and with a secondary side winding to be coupled to the load circuit, the method comprising a step of determining a secondary side current as a function of a primary side current and a primary side voltage and a primary side inductance and a transformer ratio.

According to a fourth aspect of the invention, a computer program product is provided for performing the step of the method as defined above. A computer program product is a software (program) product.

According to a fifth aspect of the invention, a medium is provided for storing and comprising the computer program product as defined above. A medium can be any kind of carrier for carrying a software (program) product.

The invention is based on an insight that relatively complex timing and modeling circuitry and auxiliary windings are to be avoided.

The invention is based on a basic idea that in a driver circuit comprising a transformer circuit, a secondary side current can be determined as a function of a primary side current and a primary side voltage and a primary side inductance and a transformer ratio.

The invention has solved a problem in that it provides a driver circuit for driving a load circuit, which driver circuit can determine a secondary side current at a primary side of a transformer circuit without requiring relatively complex timing and modeling circuitry.

The invention is further advantageous in that the driver circuit can be relatively small and relatively low cost.

These and other aspects of the invention are apparent from and will be elucidated with reference to the embodiment(s) described hereinafter.

DETAILED DESCRIPTION OF EMBODIMENTS

Figure 1:
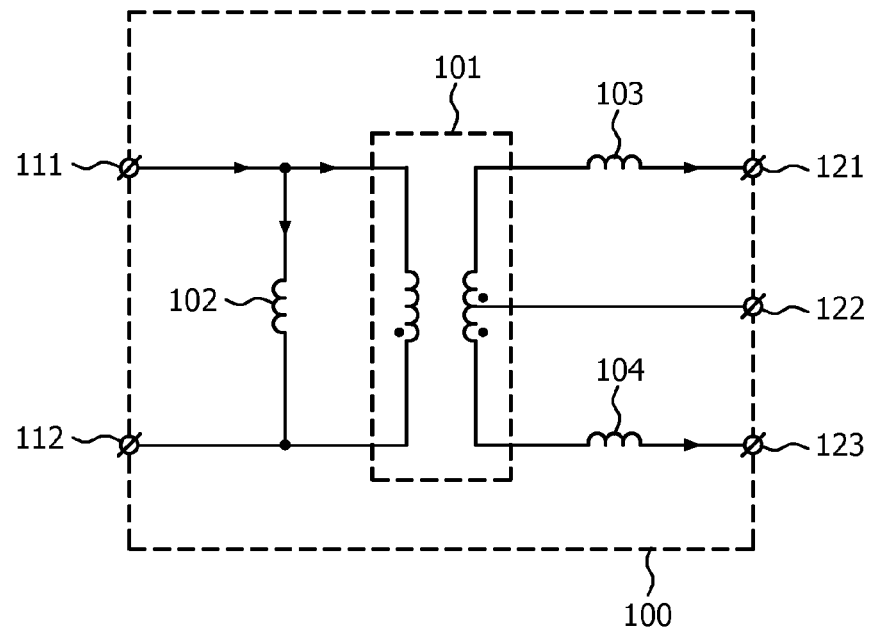
FIG. 1 shows an electrical equivalence of a transformer circuit.

In FIG. 1, an electrical equivalence 100 of a transformer circuit is shown. The electrical equivalence 100 comprises an ideal transformer circuit 101 with a primary side winding and with first and second secondary side windings. The primary side winding is connected to primary side terminals 111 and 112 and is connected in parallel with an inductor 102. The first secondary side winding is connected via an inductor 103 to a secondary side terminal 121 and is connected to a secondary side terminal 122. The second secondary side winding is connected to the secondary side terminal 122 and is connected via an inductor 104 to a secondary side terminal 123.

Figure 2:
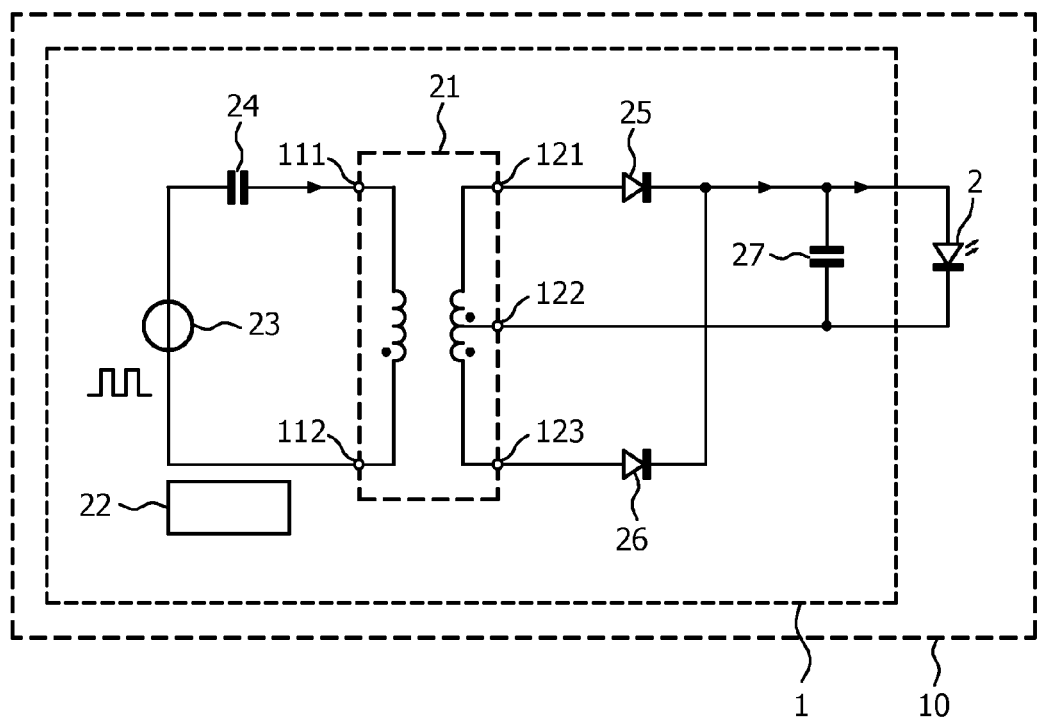
FIG. 2 shows a first embodiment of a driver circuit.

In FIG. 2, a device 10 comprising a first embodiment of a driver circuit 1 for driving a load circuit is shown. The load circuit comprises a load 2 that comprises for example one or more light emitting diodes. The driver circuit 1 comprises a transformer circuit 21 comprising a primary side winding connected to primary side terminals 111 and 112 (to be) coupled to a source circuit via a capacitor 24. The source circuit for example comprises an inverter 23 (or another switching circuit) coupled to a supply. The inverter 23 may form part of the driver circuit 1 or may be located outside the driver circuit 1 and form part of the device 10 or may be located outside the device 10. The transformer circuit 21 further comprises first and second secondary side windings. The first secondary side winding is connected to secondary side terminals 121 and 122 and the second secondary side winding is connected to secondary side terminals 122 and 123. The secondary side terminal 121 is coupled via a diode 25 to a parallel connection of capacitor 27 and load 2. The secondary side terminal 123 is coupled via a diode 26 to the parallel connection. The diodes 25 and 26 are one-way rectifiers. The capacitor 27 forms a low-pass filter for the load 2. Here, both secondary side windings are coupled in an antiparallel construction to allow two-way rectifications. Alternatively, the transformer circuit 21 may comprise a single secondary side winding coupled via a two-way rectifier such as a rectifier bridge to the parallel connection.

The driver circuit 1 further comprises a determination circuit 22 for determining a secondary side current as a function of a primary side current and a primary side voltage and a primary side inductance and a transformer ratio, under the assumption that the transformer circuit 21 is relatively symmetric and/or substantially symmetric. The primary side current for example flows through the primary side terminal 111. The primary side voltage is for example the voltage present across the primary side terminals 111 and 112. Said function for example defines the secondary side current to be proportional to a difference between a first signal proportional to an integral of the primary side voltage divided by the primary side inductance and a second signal proportional to the primary side current, the difference being multiplied by the transformer ratio. The primary side inductance may be an inductance measured at a primary side of the transformer circuit 21 for an open secondary side of the transformer circuit 21, and may for example correspond with the inductor 102 as shown in FIG. 1. The transformer ratio may be a voltage ratio of the transformer circuit 21 for an open secondary side of the transformer circuit 21, and may for example correspond with a number of turns of the secondary side winding divided by a number of turns of the primary side winding. The difference may be rectified before or after being multiplied by the transformer ratio and may be low-pass filtered after being multiplied by the transformer ratio.

Figure 3:
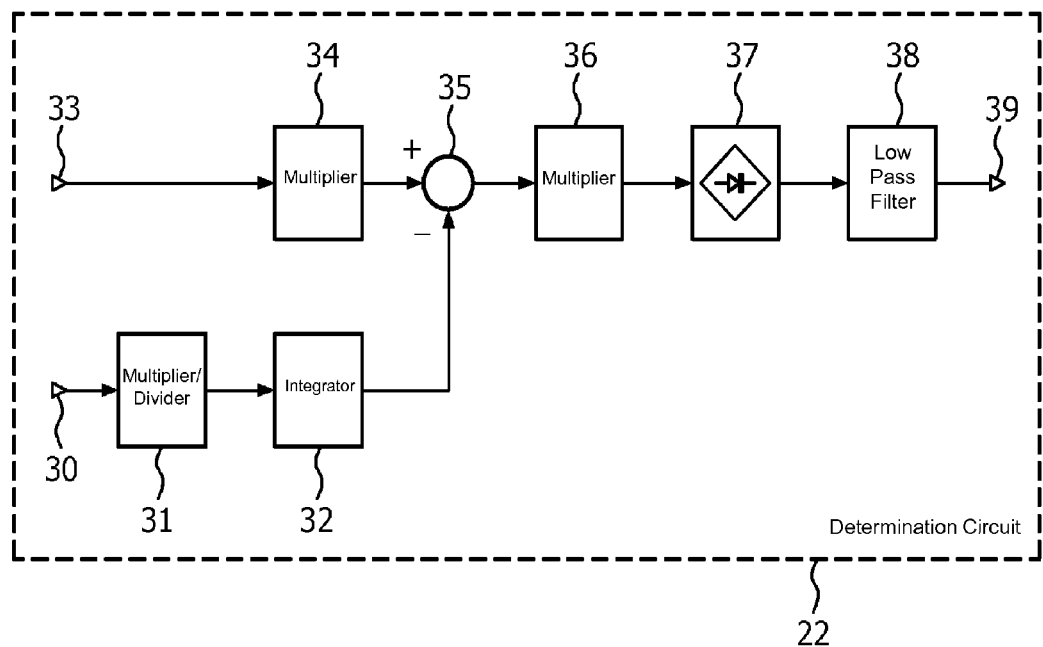
FIG. 3 shows a first embodiment of a determination circuit.

In FIG. 3, a first embodiment of a determination circuit 22 is shown. The determination circuit 22 comprises a conversion circuit 30-35 for establishing the first signal by multiplying the primary side voltage by a resistance and dividing the primary side voltage by the primary side inductance and taking the integral, and for establishing the second signal by multiplying the primary side current by the resistance and for taking the difference. To achieve this, the determination circuit 22 comprises a terminal 30 for receiving the primary side voltage, a multiplier/divider 31, an integrator 32, a terminal 33 for receiving the primary side current, a multiplier 34 and a subtracter 35. The determination circuit 22 further comprises an adaptation circuit 36-39 for rectifying the difference and for multiplying the difference by the transformer ratio and for low-pass filtering the difference. For this purpose, the determination circuit 22 comprises a multiplier 36 and a rectifier 37 that may trade places, a low-pass filter 38 and a terminal 39 for providing a representation of the secondary side current. Such a representation can be used for information and/or controlling purposes.

According to a first option, the terminals 30 and 33 may be coupled directly or indirectly via one or more elements to the primary side terminals 111 and 112. According to a second option, information about the primary side voltage and the primary side current may be provided in a different wired or wireless way to the conversion circuit 30-35, before or after being processed.

Figure 4:
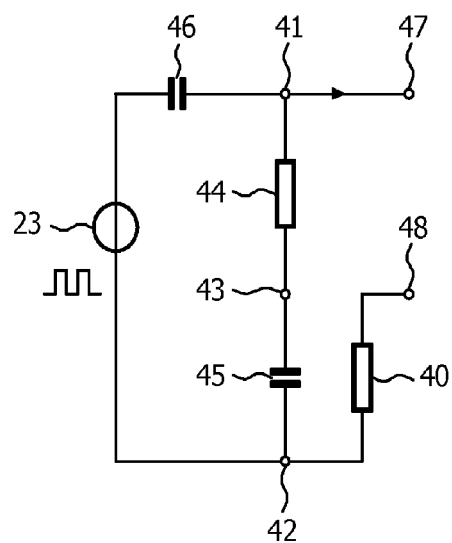
FIG. 4 shows an implementation of a conversion circuit.

In FIG. 4, an implementation of a conversion circuit 40-48 is shown. The conversion circuit 40-48 comprises first and second input terminals 41 and 42 to be coupled to the source circuit via a capacitor 46, a serial circuit of a further resistance 44 and a capacitance 45 coupled to the input terminals 41 and 42, and first and second output terminals 47 and 48 that correspond with the primary side terminals 111 and 112. A connection between the serial circuit of the further resistance 44 and the capacitance 45 forms a terminal 43. The first output terminal 47 is coupled to the first input terminal 41, and the second output terminal 48 is coupled to the second input terminal 42 via the resistance 40 already discussed with reference to FIG. 3. The primary side current flows through the first output terminal 47 and the primary side voltage is present across the output terminals 47 and 48. A value of the capacitance 45 may be proportional and/or equal to the primary side inductance divided by the resistance 40 and by the further resistance 44. Practical values for the resistance 40 and the further resistance 44 are 1 Ohm and 1 Mega-Ohm, respectively, without excluding other values. At the terminal 43, a signal is present that represents an output signal from the subtracter 35 in FIG. 3.

Figure 5:
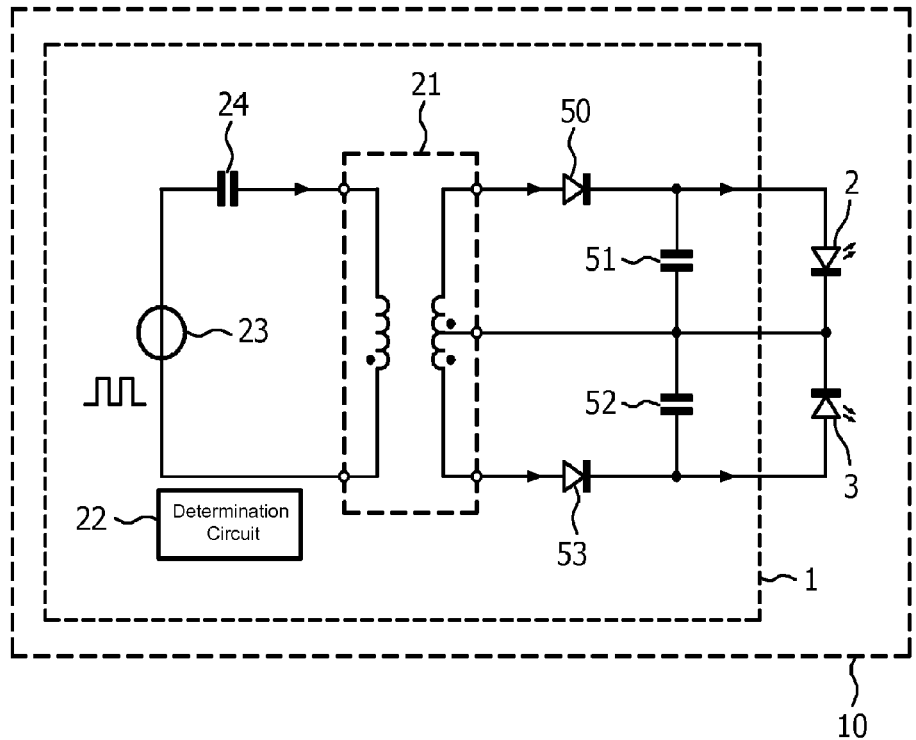
FIG. 5 shows a second embodiment of a driver circuit.

In FIG. 5, a device 10 comprising a second embodiment of a driver circuit 1 for driving a load circuit is shown. The load circuit comprises a load 2 that comprises for example one or more light emitting diodes. The load circuit further comprises a further load 3 that for example comprises one or more light emitting diodes. As already described with reference to FIG. 2, the driver circuit 1 comprises a transformer circuit 21 comprising a primary side winding (to be) coupled to a source circuit via a capacitor 24. The source circuit for example comprises an inverter 23 (or another switching circuit) coupled to a supply etc. The transformer circuit 21 further comprises secondary side windings. The load 2 is coupled in parallel with a capacitor 51 and is coupled via a diode 50 to a secondary side winding of the transformer circuit 21. The further load 3 is coupled in parallel with a capacitor 52 and is coupled via a diode 53 to a further secondary side winding of the transformer circuit 21. The determination circuit 22 is designed for determining a secondary side current flowing through the load 2 as a function of a primary side current and a primary side voltage and a primary side inductance and a transformer ratio and is designed for determining a further secondary side current flowing through the further load 3 as a further function of the primary side current and the primary side voltage and the primary side inductance and a further transformer ratio.

Said function for example defines the secondary side current to be proportional to a difference between a first signal proportional to an integral of the primary side voltage divided by the primary side inductance and a second signal proportional to the primary side current, the difference being multiplied by the transformer ratio, and said further function for example defines the further secondary side current to be proportional to the difference between the first signal and the second signal, the difference being multiplied by the further transformer ratio. The primary side inductance may be an inductance measured at a primary side of the transformer circuit 21 for open secondary sides of the transformer circuit 21, and may for example correspond with the inductor 102 as shown in FIG. 1. The (further) transformer ratio may be a voltage ratio of the transformer circuit 21 for open secondary sides of the transformer circuit 21, and may for example correspond with a number of turns of the (further) secondary side winding divided by a number of turns of the primary side winding. The difference may be rectified before or after being multiplied by the (further) transformer ratio and may be low-pass filtered after being multiplied by the (further) transformer ratio. In the driver circuit 1 shown in FIG. 5, the load 2 and the further load 3 may be controlled individually and independently of each other.

Figure 6:
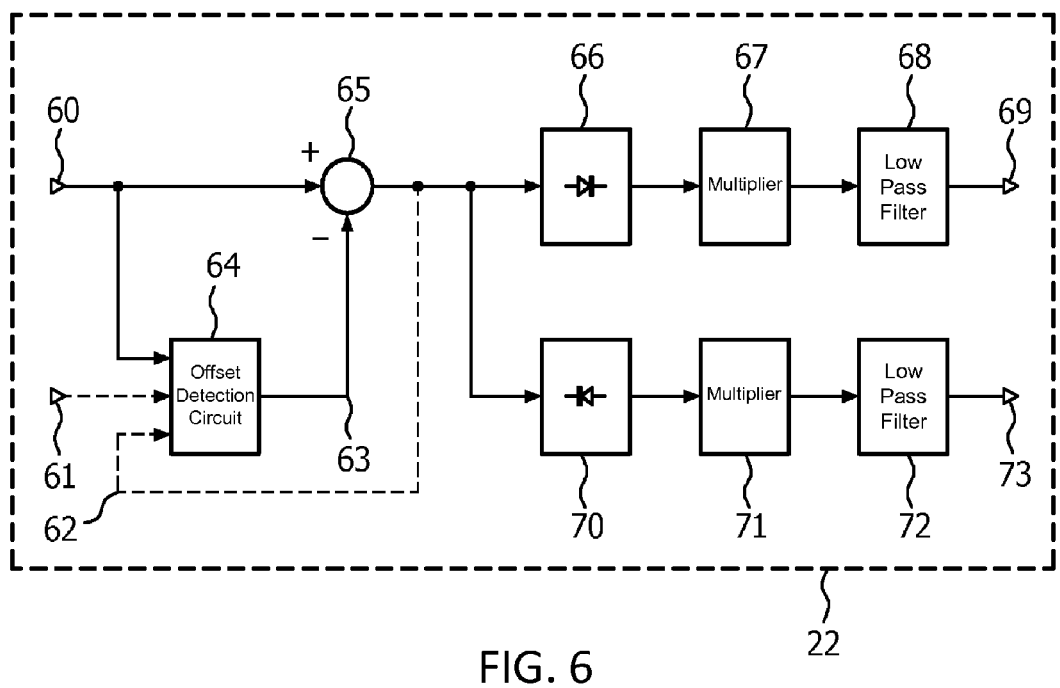
FIG. 6 shows a second embodiment of a determination circuit.

In FIG. 6, a second embodiment of a determination circuit 22 is shown. The determination circuit 22 comprises a conversion circuit for establishing the first signal by multiplying the primary side voltage by a resistance and dividing the primary side voltage by the primary side inductance and taking the integral, and for establishing the second signal by multiplying the primary side current by the resistance and for taking the difference as already described with reference to FIG. 3, and therefore not shown again in FIG. 6. The determination circuit 22 further comprises an adaptation circuit 66-69 for rectifying the difference and for multiplying the difference by the transformer ratio and for low-pass filtering the difference. To this end, the determination circuit 22 comprises a multiplier 67 and a rectifier 66 that may trade places, a low-pass filter 68 and a terminal 69 for providing a representation of the secondary side current. The determination circuit 22 further comprises a further adaptation circuit 70-73 for rectifying the difference and for multiplying the difference by the further transformer ratio and for low-pass filtering the difference. To this end, the determination circuit 22 comprises a multiplier 71 and a rectifier 70 that may trade places, a low-pass filter 72 and a terminal 73 for providing a representation of the further secondary side current. Such representations can be used for information and/or controlling purposes.

The determination circuit 22 may further comprise an offset detection circuit 64 coupled between the conversion circuit 30-35, 40-48 on the one hand and the adaptation circuits 66-73 on the other hand for, in response to a trigger signal, detecting an offset in the difference. For this purpose, a first input of the offset detection circuit 64 is coupled to a terminal 60 for receiving the output signal from the subtracter 35 in FIG. 3 (the signal present at the terminal 43 in FIG. 4). A second input of the offset detection circuit 64 is coupled to a terminal 61 for receiving a source circuit signal. A third input of the offset detection circuit 64 is coupled to a terminal 62 for receiving an output signal from a subtracter 65. A positive input of the subtracter 65 is coupled to the terminal 60 and a negative input of the subtracter 65 is coupled to an output 63 of the offset detection circuit 64.

The offset detection circuit 64 detects an offset or DC component in the output signal from the subtracter 35 in FIG. 3. Such an offset or DC component may result from the loads 2 and 3 being asymmetric. The combination of the offset detection circuit 64 and the subtracter 65 reduces and preferably cancels this offset or DC component.

Figure 7:
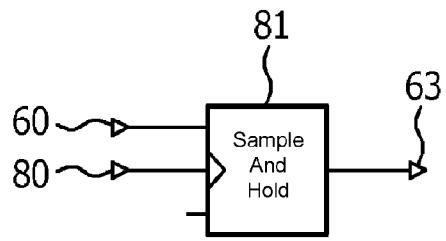
FIG. 7 shows a first embodiment of an offset detection circuit.

In FIG. 7, a first embodiment of an offset detection circuit is shown. This offset detection circuit comprises a sample and hold circuit 81 having a first input coupled to the terminal 60 and having a second input coupled to a terminal 80 for receiving the trigger signal from a generation circuit discussed with reference to FIGS. 9 and 10 and having an output corresponding with the output 63.

Figure 8:
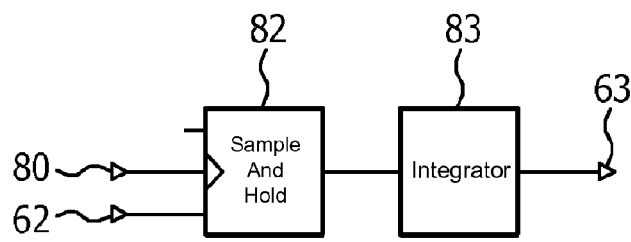
FIG. 8 shows a second embodiment of an offset detection circuit.

In FIG. 8, a second embodiment of an offset detection circuit is shown. This offset detection circuit comprises a sample and hold circuit 82 having a first input coupled to the terminal 80 for receiving the trigger signal from a generation circuit discussed with reference to FIGS. 9 and 10 and having a second input coupled to the terminal 62 and having an output coupled to an input of an integration circuit 83 that has an output corresponding with output 63.

Figure 9:
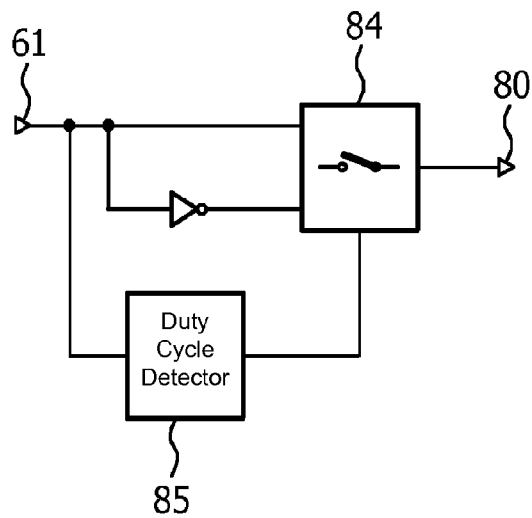
FIG. 9 shows a first embodiment of a generation circuit.

In FIG. 9, a first embodiment of a generation circuit 84, 85 for generating a trigger signal is shown. This generation circuit 84, 85 comprises a selector circuit 84 that receives a source circuit signal and an inversion thereof, wherein in dependence on a duty cycle of the source circuit as detected by a duty cycle detector 85 either a rising edge or a falling edge will result in the trigger signal offered to the terminal 80.

Figure 10:
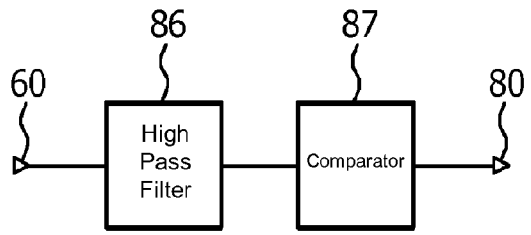
FIG. 10 shows a second embodiment of a generation circuit.

In FIG. 10, a second embodiment of a generation circuit 86, 87 for generating a trigger signal is shown. This generation circuit 86, 87 comprises an optional high-pass filter 86 for filtering the output signal from the subtracter 35 in FIG. 3 (the signal present at the terminal 43 in the FIG. 4) as offered at terminal 60, and comprises a comparator circuit 87, wherein the output signal from the conversion circuit 30-35, possibly after being high-pass filtered, is compared with a threshold and a comparison result will result in the trigger signal offered to the terminal 80. This second embodiment detects discontinuities in (the derivative of) the output signal from the subtracter 35.

Figure 11:
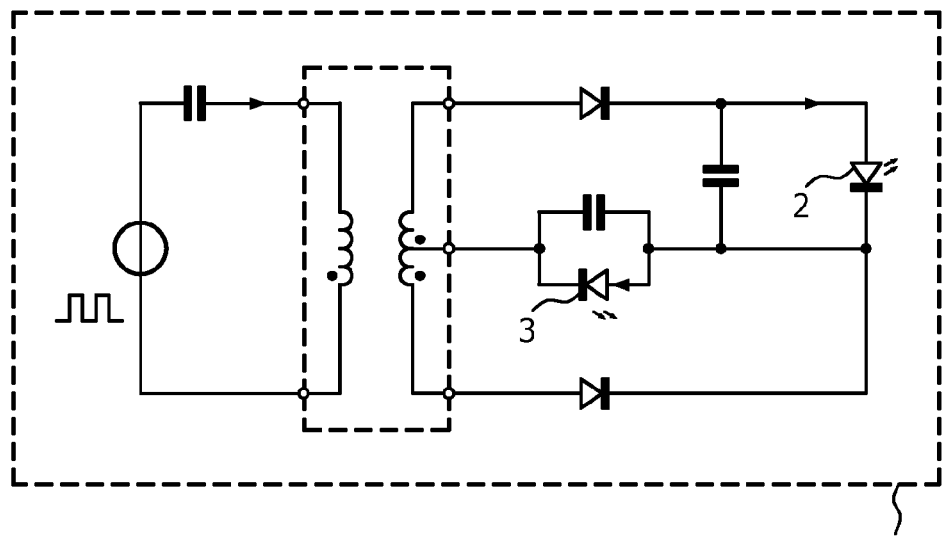
FIG. 11 shows a third embodiment of a driver circuit.

In FIG. 11, a device 10 comprising a third embodiment of a driver circuit is shown. Compared to the second embodiment shown in the FIG. 5, where a first load 2 receives a first secondary side current and where a second load 3 receives a second secondary side current, in the third embodiment the first load 2 receives the first secondary side current and the second load 3 receives a sum of the first and second secondary side currents. In the driver circuit shown in the FIG. 11, the load 2 and the further load 3 may be controlled individually and independently of each other.

Figure 12:
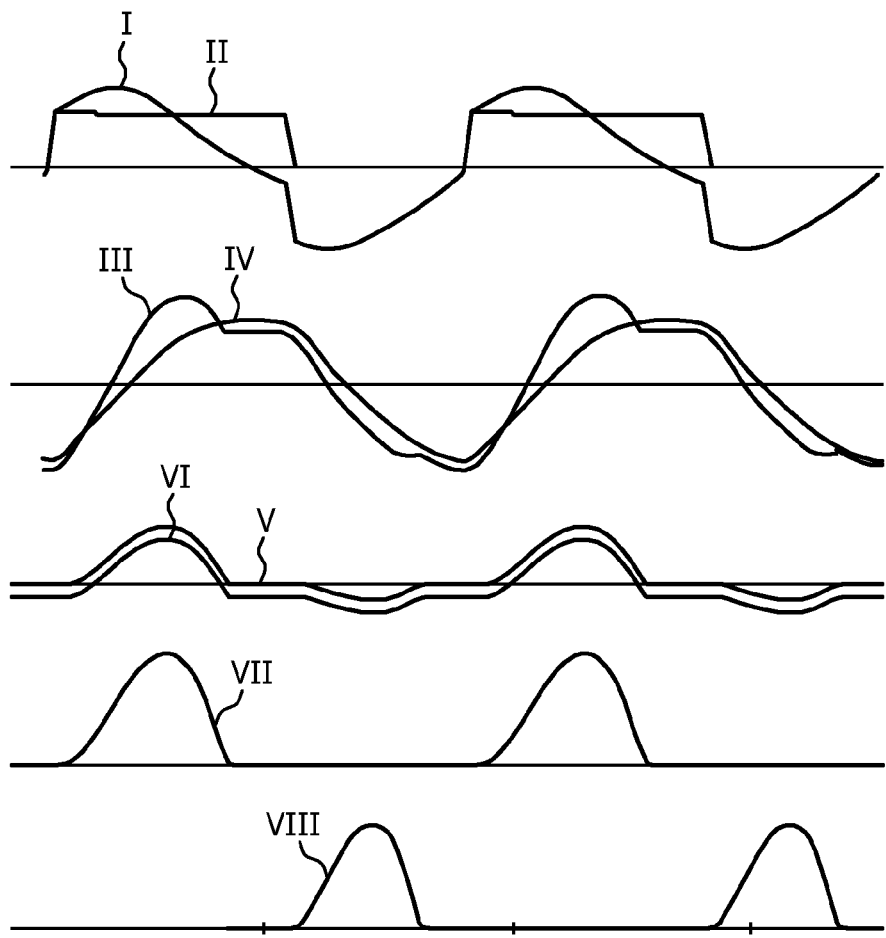
FIG. 12 shows signals present in the determination circuit of FIG. 6.

In FIG. 12, signals present in the determination circuit of FIG. 6 are shown. I represents the primary side voltage, II represents a source circuit signal, III represents an output signal from the multiplier 34, IV represents an output signal from the integrator 32, V represents an output signal from the subtracter 65, VI represents an output signal from the subtracter 35, VII represents a signal present between blocks 67 and 68, and VIII represents a signal present between blocks 71 and 72.

Preferably, the driver circuit 1 comprises an inductor circuit with an inductor between the secondary side winding and the load 2, and with a further inductor between the further secondary side winding and the further load 3, the inductor and the further inductor being inductively coupled for balancing the secondary side current and the further secondary side current, as shown in FIGS. 13-16.

Figure 13:
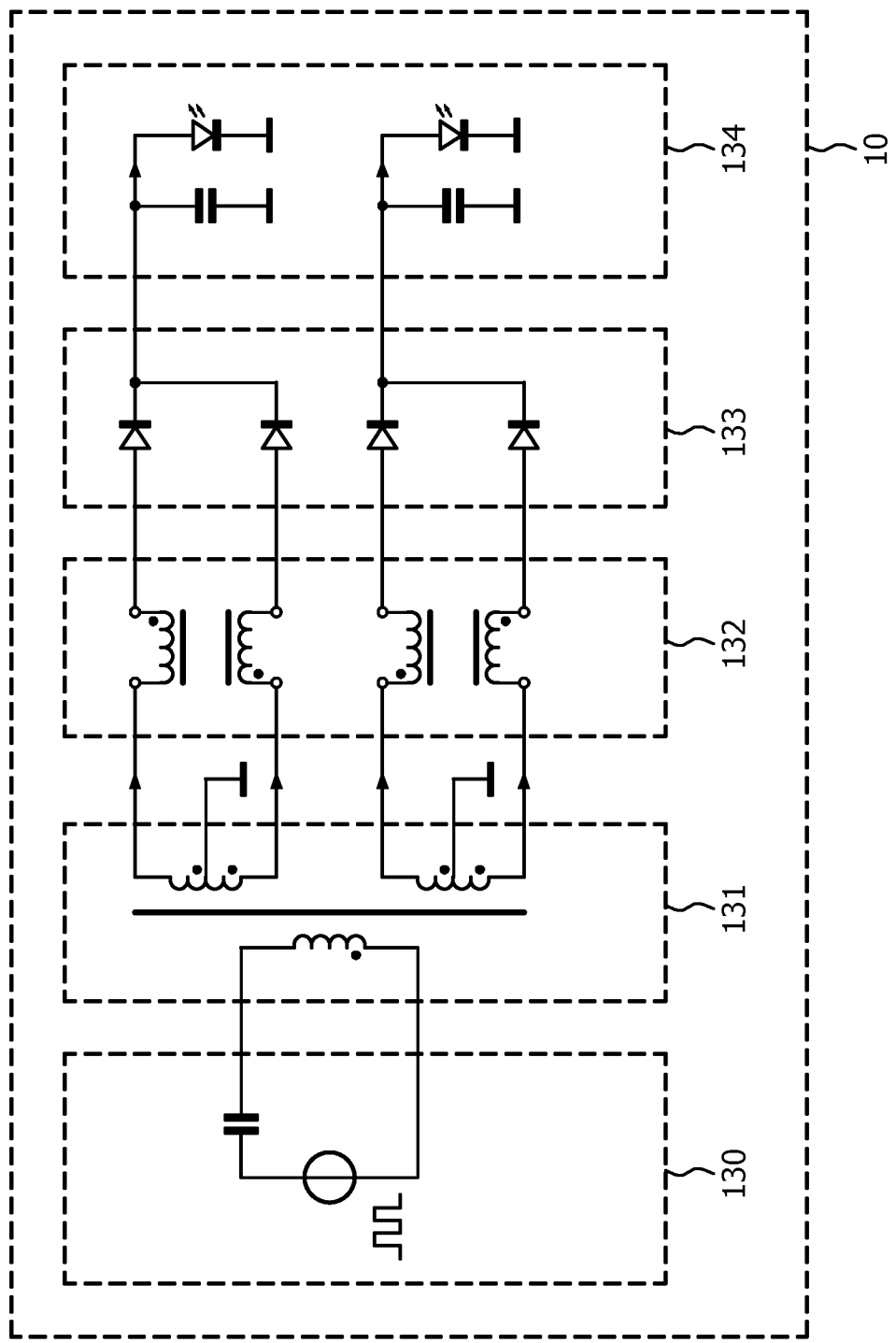
FIG. 13 shows a fourth embodiment of a driver circuit.

In FIG. 13, a device 10 comprising a fourth embodiment of a driver circuit is shown. A source circuit 130 is followed by a transformer circuit 131, an inductor circuit 132, a rectification circuit 133 and a load circuit 134. All inductors shown in the inductor circuit 132 are inductively coupled for balancing the secondary side currents.

Figure 14:
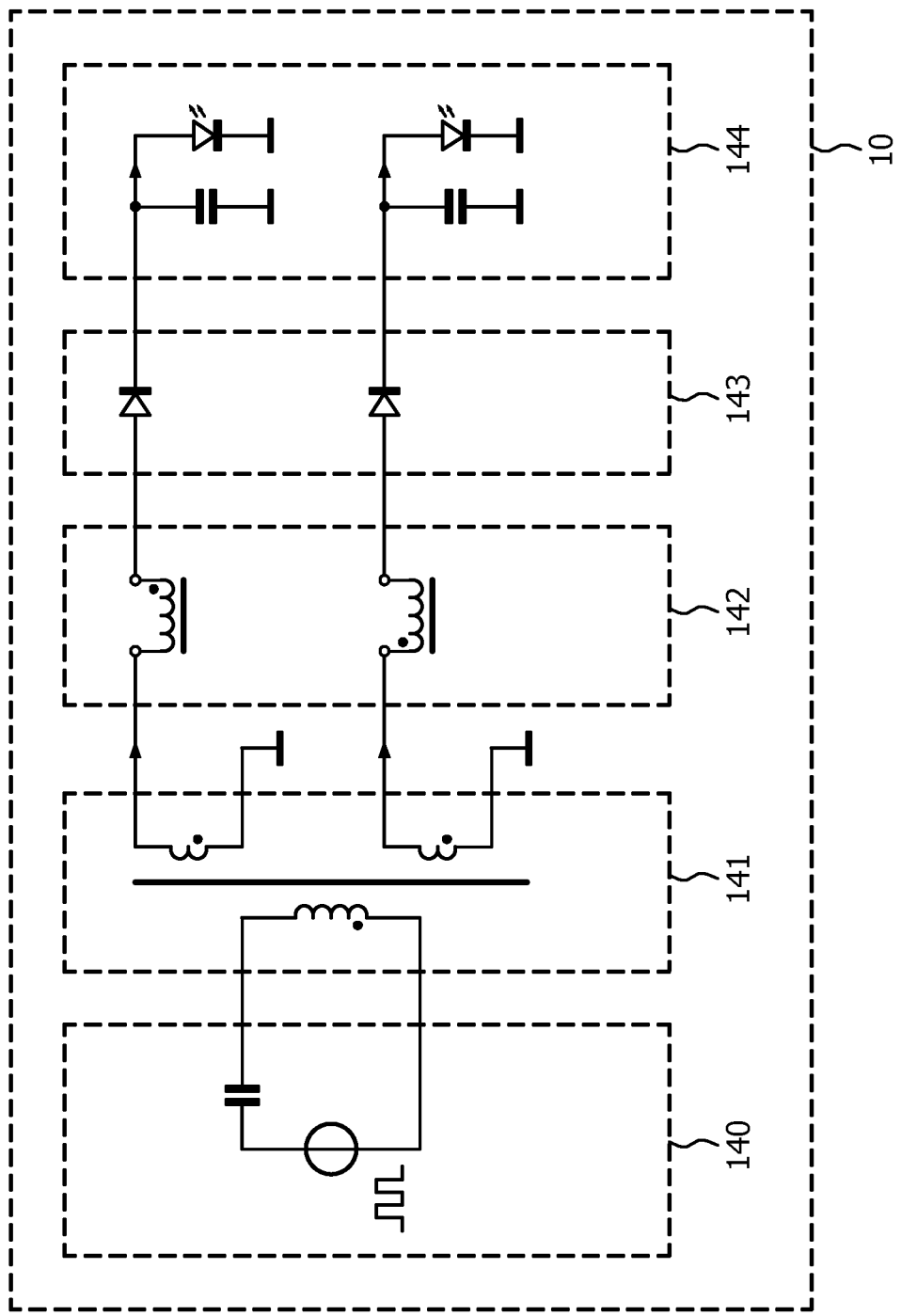
FIG. 14 shows a fifth embodiment of a driver circuit.

In FIG. 14, a device 10 comprising a fifth embodiment of a driver circuit is shown. A source circuit 140 is followed by a transformer circuit 141, an inductor circuit 142, a rectification circuit 143 and a load circuit 144. All inductors shown in the inductor circuit 142 are inductively coupled for balancing the secondary side currents.

Figure 15:
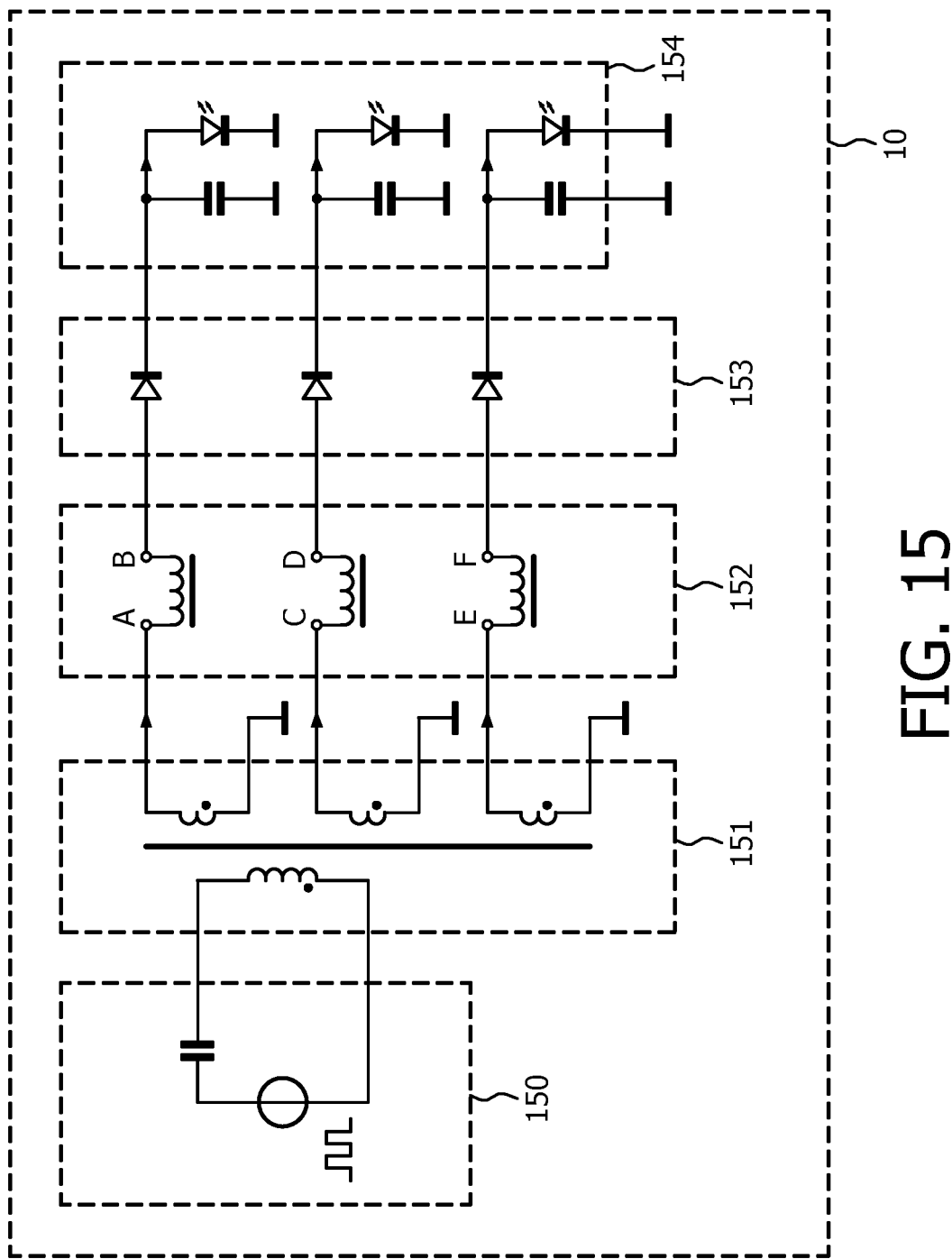
FIG. 15 shows a sixth embodiment of a driver circuit.

In FIG. 15, a device 10 comprising a sixth embodiment of a driver circuit is shown. A source circuit 150 is followed by a transformer circuit 151, an inductor circuit 152, a rectification circuit 153 and a load circuit 154. All inductors shown in the inductor circuit 152 are inductively coupled for balancing the secondary side currents.

Figure 16:
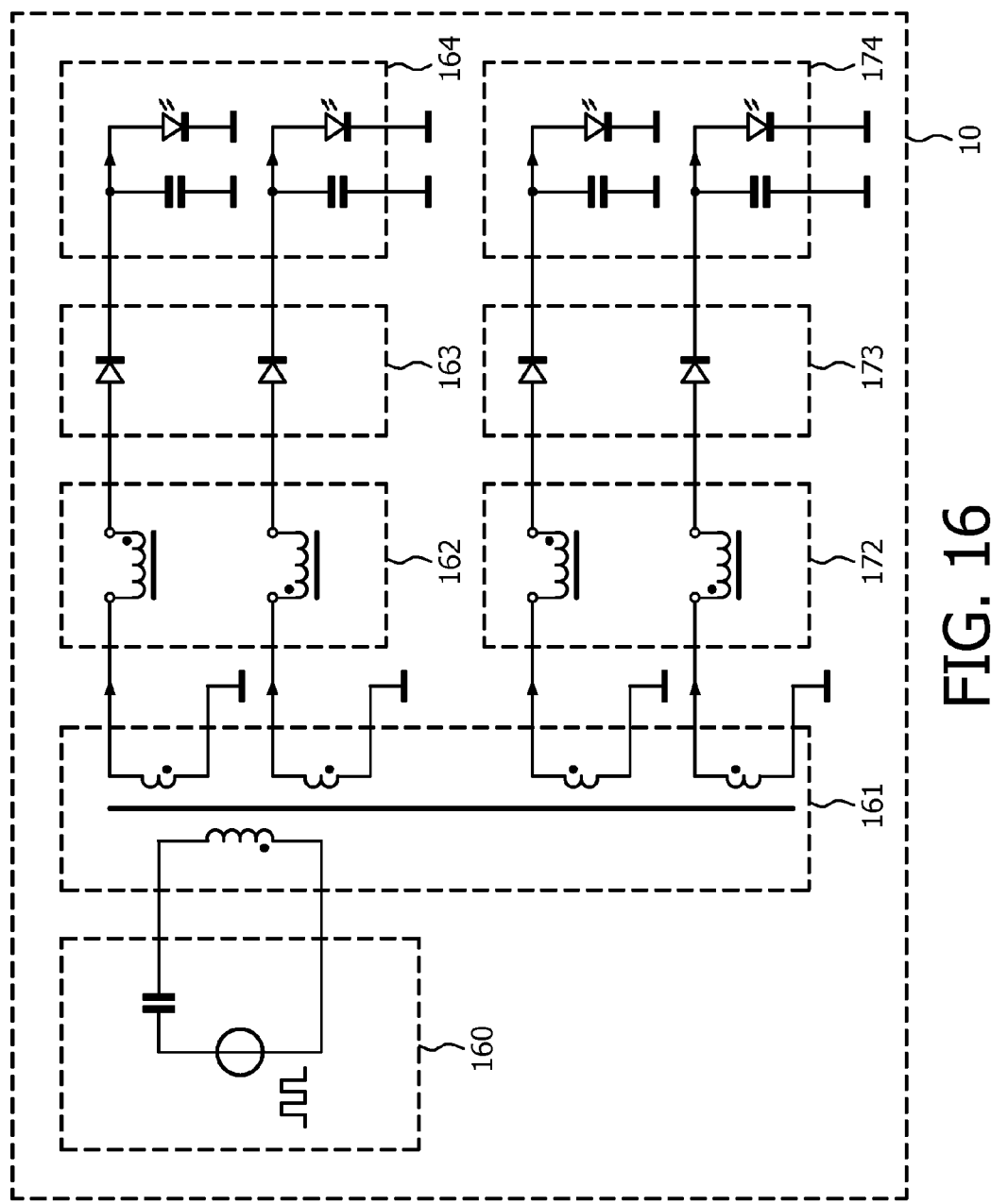
FIG. 16 shows a seventh embodiment of a driver circuit.

In FIG. 16, a device 10 comprising a seventh embodiment of a driver circuit is shown. A source circuit 160 is followed by a transformer circuit 161, and firstly by an inductor circuit 162, a rectification circuit 163 and a load circuit 164, and secondly by an inductor circuit 172, a rectification circuit 173 and a load circuit 174. All inductors shown in each one of the inductor circuits 162 and 172 are inductively coupled for balancing the secondary side currents per load circuit 164, 174. In the driver circuit shown in FIG. 16, the load circuits 164 and 174 may be controlled individually and independently of each other.

For the fourth, fifth, sixth and seventh embodiments of the driver circuit as shown in FIGS. 13-16, a primary side current as sensed on a primary side (as described with reference to FIGS. 1-12) will be (a kind of) an average of the secondary side current.

Figure 17:
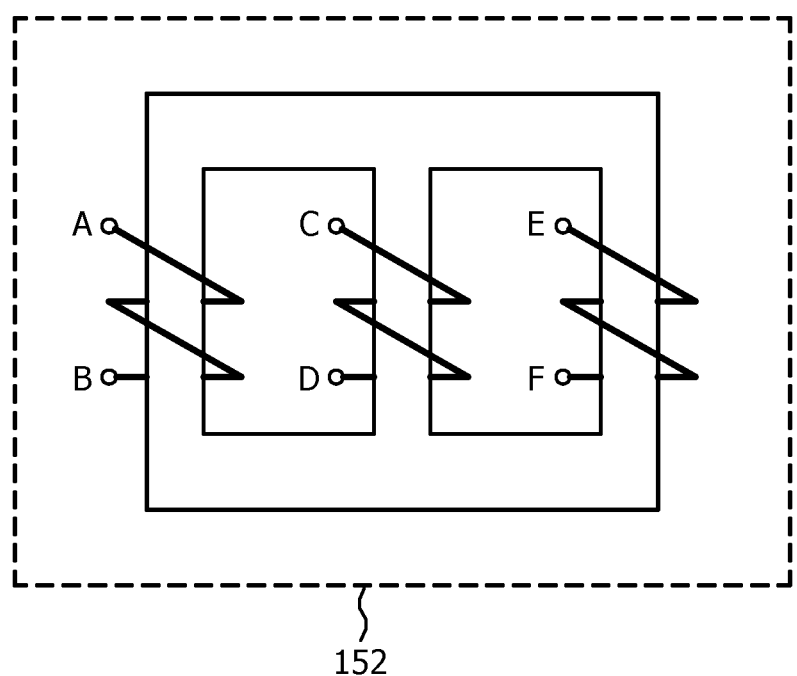
FIG. 17 shows a possible realization of an inductor circuit for the sixth embodiment of the driver circuit of FIG. 15.

In FIG. 17, a possible realization of an inductor circuit 152 for the sixth embodiment of the driver circuit of FIG. 15 is shown.

Each block of the determination circuit 22 shown in FIGS. 3 and 6 may be hardware, software or a mixture of both. Every two or more blocks may be combined, and each block may be divided into two or more sub-blocks.

Summarizing, driver circuits 1 for driving load circuits comprise transformer circuits 21 with primary side windings to be coupled to source circuits and with secondary side windings to be coupled to the load circuits. By providing the driver circuits 1 with determination circuits 22 for determining secondary side currents as functions of primary side currents, primary side voltages, primary side inductances and transformer ratios, the secondary side currents can be determined solely at primary sides of the transformer circuits 21. Functions may define secondary side currents to be proportional to differences between first signals proportional to integrals of primary side voltages divided by primary side inductances and second signals proportional to primary side currents, the differences being multiplied by the transformer ratios. The primary side inductances may be inductances measured at primary sides and the transformer ratios may be voltage ratios of the transformer circuits 21, both for open secondary sides of the transformer circuits 21.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment where different parts of the different disclosed embodiments are combined into a new embodiment.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A driver circuit for driving a load circuit, the driver circuit comprising
   a transformer circuit with a primary side winding to be coupled to a source circuit and with a secondary side winding to be coupled to the load circuit, and
   a determination circuit for determining a secondary side current as a function of a primary side current and a primary side voltage and a primary side inductance and a transformer ratio,
   wherein the load circuit comprises a load, the load comprising one or more light emitting diodes, said function defining the secondary side current to be proportional to a difference between a first signal proportional to an integral of the primary side voltage divided by the primary side inductance and a second signal proportional to the primary side current, wherein the difference is multiplied by the transformer ratio, and
   wherein the primary side inductance is an inductance measured at a primary side of the transformer circuit for an open secondary side of the transformer circuit, the transformer ratio being a voltage ratio of the transformer circuit for an open secondary side of the transformer circuit, and the difference is rectified before or after being multiplied by the transformer ratio and the difference is low-pass filtered after being multiplied by the transformer ratio.

2. The driver circuit as claimed in claim 1, the determination circuit comprising a conversion circuit for establishing the first signal by multiplying the primary side voltage by a resistance and by dividing the primary side voltage by the primary side inductance and by taking the integral, and for establishing the second signal by multiplying the primary side current by the resistance and for taking the difference, the determination circuit further comprising an adaptation circuit for rectifying the difference and for multiplying the difference by the transformer ratio and for low-pass filtering the difference.

3. The driver circuit as claimed in claim 2, the conversion circuit comprising first and second input terminals to be coupled to the source circuit, a serial circuit of a further resistance and a capacitance coupled to the input terminals, and first and second output terminals, the first output terminal being coupled to the first input terminal, the second output terminal being coupled to the second input terminal via the resistance, the primary side current flowing through the first output terminal and the primary side voltage being present across the output terminals, and a value of the capacitance being proportional to the primary side inductance divided by the resistance and by the further resistance.

4. A driver circuit for driving a load circuit, the driver circuit comprising
a transformer circuit with a primary side winding to be coupled to a source circuit and with a secondary side winding to be coupled to the load circuit, and
a determination circuit for determining a secondary side current as a function of a primary side current and a primary side voltage and a primary side inductance and a transformer ratio,
wherein the load circuit comprises a load to be coupled to the secondary side winding and a further load to be coupled to a further secondary side winding of the transformer circuit, the load comprising one or more light emitting diodes, the further load comprising one or more further light emitting diodes, the determination circuit being designed for determining a further secondary side current as a further function of the primary side current and the primary side voltage and the primary side inductance and a further transformer ratio,
wherein said function defines the secondary side current to be proportional to a difference between a first signal proportional to an integral of the primary side voltage divided by the primary side inductance and a second signal proportional to the primary side current, the difference being multiplied by the transformer ratio, and wherein said further function defines the further secondary side current to be proportional to the difference between the first signal and the second signal, the difference being multiplied by the further transformer ratio,
wherein the determination circuit comprises a conversion circuit for establishing the first signal by multiplying the primary side voltage by a resistance and dividing the primary side voltage by the primary side inductance and taking the integral, and for establishing the second signal by multiplying the primary side current by the resistance and for taking the difference between said two signals,
wherein the determination circuit further comprises an adaptation circuit for rectifying the difference and for multiplying the difference by the transformer ratio and for low-pass filtering the difference, and
wherein the determination circuit further comprises a further adaptation circuit for rectifying the difference and for multiplying the difference by the further transformer ratio and for low-pass filtering the difference.

5. The driver circuit as claimed in claim 4, the determination circuit further comprising an offset detection circuit coupled between the conversion circuit on the one hand and the adaptation circuits on the other hand for in response to a trigger signal detecting an offset in the difference.

6. The driver circuit as claimed in claim 5, the determination circuit further comprising a generation circuit coupled to the offset detection circuit for generating the trigger signal.

7. The driver circuit as claimed in claim 4, further comprising an inductor circuit with an inductor between the secondary side winding and the load, and with a further inductor between the further secondary side winding and the further load, the inductor and the further inductor being inductively coupled for balancing the secondary side current and the further secondary side current.

8. A method of driving a load circuit via a transformer circuit with a primary side winding to be coupled to a source circuit and with a secondary side winding to be coupled to the load circuit wherein the load circuit comprises a load, the load comprising one or more light emitting diodes, the method comprising:
determining a secondary side current as a function of a primary side current and a primary side voltage and the primary side inductance and a transformer ratio, the function defining the secondary side current to be proportional to a difference between a first signal proportional to an integral of the primary side voltage divided by the primary side inductance and a second signal proportional to the primary side current,
wherein the primary side inductance is an inductance measured at a primary side of the transformer circuit for an open secondary side of the transformer circuit, and the transformer ratio is a voltage ratio of the transformer circuit for an open secondary side of the transformer circuit, and
wherein determining the secondary side current includes:
multiplying the difference by the transformer ratio,
rectifying the difference before or after multiplying the difference by the transformer ratio, and
low-pass filtering the difference after the difference is multiplied by the transformer ratio.

9. The method of claim 8, wherein determining the secondary side current circuit comprises:
establishing the first signal by multiplying the primary side voltage by a resistance and by dividing the primary side voltage by the primary side inductance and by taking the integral, and
establishing the second signal by multiplying the primary side current by the resistance and for taking the difference.

* * * * *